UNITED STATES PATENT OFFICE.

GEORGE M. SAYBOLT, OF JERSEY CITY, NEW JERSEY, ASSIGNOR TO THE STANDARD OIL COMPANY OF NEW YORK, OF NEW YORK, N. Y.

PROCESS OF REFINING HYDROCARBON OILS.

SPECIFICATION forming part of Letters Patent No. 565,039, dated August 4, 1896.

Application filed December 13, 1895. Serial No. 572,082. (No specimens.)

*To all whom it may concern:*

Be it known that I, GEORGE M. SAYBOLT, of Jersey City, in the county of Hudson and State of New Jersey, have invented a new and useful Improvement in the Processes of Refining Hydrocarbon Oils, of which the following is a full, clear, and exact description.

My improved process is specially designed for use in the treatment of the distillates of crude petroleum, but is also adapted to the refining of other equivalent hydrocarbon oils, such as the final distillates of shale-oil, oil distilled from bituminous coal, (coal-oil,) and the final distillates of bitumen, asphalt, and of other hydrocarbons.

As the practice of my improved process is substantially the same in the treatment of any of the distillates above mentioned, I shall confine my description to its use in the refining of petroleum.

The ordinary so-called "sulfuric-acid treatment" of the distillates of crude petroleum consists in placing the distilled oil in a suitable tank or vessel and adding thereto a suitable quantity of sulfuric acid, (the amount depending on the character of the distillate,) as is well known to those skilled in the art. The oil and acid are then thoroughly mixed by agitation, either by a mechanical agitator or by a current of atmospheric air forced into the tank in such manner that the air issues from the air-pipe at or near the bottom of the liquid, so as to cause the sulfuric acid to be thoroughly mixed with the distillate. The result of this treatment is that the distillate is to a great extent deodorized, and that the heavier hydrocarbons, such as tar and other solid impurities, are separated from the distillate and settle to the bottom of the tank, as what is known in the art as "sludge acid." This sludge acid is then drawn off by a suitable cock, or the partially-purified distillate is decanted from the sludge acid, as may be preferred.

Fuming sulfuric acid should not be used in the acid treatment above described. The employment of such strong acid is deleterious to the practice of my invention.

So far as described above, this treatment is the same as is employed by me and forms the first step of my improved process.

By the ordinary process as usually practiced after the removal of the sludge acid water is added to the oil in the tank, and its contents are agitated, as before described, and after being allowed to settle the water is then drawn off, leaving the oil in the tank, this washing operation being repeated three or four times, as may seem desirable. To the contents of the tank is then added an aqueous solution of caustic soda or other suitable alkali, and after thorough agitation the alkaline solution is drawn off from the oil. The purpose of this alkaline treatment is to neutralize the acid and thus eliminate it as far as possible from the oil. Then the oil is again washed, by agitation, with water to remove any remaining alkali, after which the water is drawn off and the oil is pumped or otherwise conveyed into settling-pans, where it remains until the oil becomes clear, when it is ready for the market.

The objection to this ordinary treatment is that as sulfuric acid, as well as water, are more or less soluble in the distillates of petroleum and other hydrocarbon oils, and that some particles of acid and water remain in the oil after the main quantity of acid, water, alkali, and oil are drawn off, and, further, that when the alkali used in the described treatment comes in contact with the treated distillate, which is clouded with acidulated water, there are formed certain alkali salts of sulfonic acids, which are not removed from the oil, even when it has become clear in appearance and of good color and odor. It is this objection to the ordinary sulfuric acid, water, and alkali treatment of hydrocarbon distillates which it is the purpose of my improved process to obviate, and which I will proceed further to describe.

After the oil distillate has been treated with sulfuric acid and agitation, as before described, and for the usual period of time, depending on the character of the hydrocarbon distillate under treatment, and, as well known in the art, the sludge acid and oil are separated from each other as quickly as possible, either by decanting the oil or by drawing off the sludge products, and there is mixed with the remaining oil a comminuted or crushed solid substantially non-alkaline absorbent, such, for example, as ordinary fullers' earth, which is a bisilicate of alumina, or bauxite, clay, or charcoal, either vegetable or animal. Any of these substances, or a mixture of them, is pulverized and added to the acid-treated distillate and thoroughly agitated or otherwise mixed therewith for a period of about an hour, more or less, depending on the character of the distillates and the quantity under treatment. After such treatment and the settlement out from the oil of the pulverized absorbent material, the oil is decanted or drawn off and will then be found to be deodorized, very much improved in color, and freed from the alkali salts of sulfonic acid which might develop on heating or otherwise, and from all traces of acid, as well as from the separated tarry matter and other impurities. The distillate is then ready for the market and will be found to be better and purer than oil refined from like acid-treated distillate by processes heretofore known. Fullers' earth or clay is the material which I prefer to add to the distillate, though equivalents thereof, as above indicated, may be substituted. The proportion of fullers' earth proper to be used depends upon the proportion of sulfuric acid which was originally employed in treating the distillate. When .6 per cent. of sulfuric acid of 66° Baumé has been used, I prefer to add to the distillate 2.5 per cent. of fullers' earth, and as the percentage of acid is increased to increase the percentage of fullers' earth, though the proportions may be varied, and my invention is not limited in scope to the employment of particular proportions.

Instead of mixing the pulverized absorbent with the distillate and agitating the mixture, the distillate, after being mixed with sulfuric acid and separated from the deposited acid sludge, may be run through a filter containing one of the pulverized absorbents before mentioned. For this purpose no special or novel construction of filter is necessary, as any filter of ordinary construction which will retain the absorbent material and allow the liquid oil to pass through it without carrying off the solid matter will suffice.

Instead of using only one of the absorbent substances a mixture of one or more of them may be used.

It is a very important feature of my improved process that the ordinary treatment with water and aqueous alkaline solution is not employed, and that my treatment dispenses with the employment of any alkaline solution; and I believe that by dispensing with these, which have been heretofore, so far as I am aware, universally employed, commercially, in purifying hydrocarbon oils after treatment with sulfuric acid, I prevent the formation of alkali salts of sulfonic acid, which are present in petroleum oils under the heretofore-practiced mode of treatment for deodorizing and decolorizing the oil, and as a result I produce refined hydrocarbon oil of superior odor and color.

Another important advantage of my improved process is that not only is the result greatly superior to that produced by use of the ordinary sulfuric-acid and alkali treatment, but that my process of refining hydrocarbon oil after distillation takes only about one-half of the time required for the conduct of the sulfuric-acid treatment where water and an alkaline solution are used.

Having thus described my improvement in the refining of hydrocarbon oils, what I claim as my invention is—

1. The method of purifying petroleum distillate, which consists in treating it, after final distillation, with non-fuming sulfuric acid, and then removing the impurities remaining after the acid treatment by bringing the distillate into intimate contact with a finely-divided, substantially non-alkaline substance without intermediate treatment of the distillate with water or alkali.

2. The method of purifying petroleum distillate, which consists in treating it, after final distillation, with non-fuming sulfuric acid, and then (without intermediate treatment with alkali or water) removing the impurities remaining after the acid treatment by bringing the distillate into intimate contact with a finely-divided clay or earth, such as fullers' earth.

3. The method of purifying petroleum distillate which consists in treating it, after final distillation, with non-fuming sulfuric acid, and then (without intermediate treatment with alkali or water) removing the impurities remaining after the acid treatment by agitating the distillate with a finely-divided substantially non-alkaline material.

In testimony whereof I have hereunto set my hand.

GEORGE M. SAYBOLT.

Witnesses:
WM. H. ERWIN,
HENRY G. PARSONS.